United States Patent [19]

Duesbury

[11] Patent Number: 4,583,819
[45] Date of Patent: Apr. 22, 1986

[54] OPTICAL FIBRE CONNECTOR USING SINGLE RESILIENT ACTUATING ELEMENT

[75] Inventor: Paul G. Duesbury, Solihull, England

[73] Assignee: Lucas Industries, plc, Birmingham, England

[21] Appl. No.: 405,109

[22] Filed: Aug. 4, 1982

[30] Foreign Application Priority Data

Aug. 18, 1981 [GB] United Kingdom ............... 8125121

[51] Int. Cl.[4] ................................................ G02B 6/38
[52] U.S. Cl. ............................... 350/96.21; 350/96.20
[58] Field of Search .............. 350/96.20, 96.21, 96.22, 350/96.23, 96.10, 96.15

[56] References Cited

U.S. PATENT DOCUMENTS

| 3,864,018 | 2/1975 | Miller | 350/96.21 |
|---|---|---|---|
| 3,885,859 | 5/1975 | Dalgleish et al. | 350/96.21 |
| 3,914,880 | 10/1975 | Dakss et al. | 350/96.21 |
| 4,033,668 | 7/1977 | Presby | 350/96.21 |
| 4,057,448 | 11/1977 | Miller | 350/96.21 |
| 4,111,522 | 9/1978 | Auracher et al. | 350/96.21 |
| 4,208,095 | 6/1980 | Malsot | 350/96.21 |
| 4,295,043 | 11/1981 | Eibner et al. | 350/96.20 |
| 4,302,071 | 11/1981 | Winzer | 350/96.20 |
| 4,522,463 | 6/1985 | Schwenda et al. | 350/96.21 |

FOREIGN PATENT DOCUMENTS

| 2717321 | 4/1977 | Fed. Rep. of Germany | 350/96.21 |
|---|---|---|---|
| 54-18760 | 2/1979 | Japan | 350/96.21 |
| 1586001 | 6/1981 | United Kingdom | 350/96.21 |

Primary Examiner—William L. Sikes
Assistant Examiner—Brian M. Healy
Attorney, Agent, or Firm—Staas & Halsey

[57] ABSTRACT

An optical fibre connector comprising a first member composed of a rigid material and formed in one surface thereof with an elongated groove for axially receiving respective end portions of a pair of optical fibres to be interconnected, a second member substantially identical with the first member and engageable therewith such that said grooves are in registration and can locate therebetween the end portions of said pair of fibres, with the end portion of each fibre being fixed relative to a respective one of the members, and a resilient element which, when said first and second members are interengaged, co-operates with said first and second members. The resilient element and said members are such that one end of the resilient element is anchored relative to the first member at a position between the free end of the end portion of one of the fibres and the point at which said one fibre projects from the first member, while the other end projects from the first member, while the other end of the resilient element is anchored relative to the second member at a position between the free end of the end portion of the other fibre and the point at which said other fibre projects from the second member. The resilient element is stressed when co-operating with said interengaged first and second members and being arranged so as thereby to impart to the first and second members a force having a first component in a direction urging said one surfaces together, and a second component in a direction parallel with the axes of the fibres so as to apply a sliding force to the members.

14 Claims, 8 Drawing Figures

OPTICAL FIBRE CONNECTOR USING SINGLE RESILIENT ACTUATING ELEMENT

BACKGROUND OF THE INVENTION

This invention relates to an optical fibre connector.

When optical fibres are used in, for example, information transmission systems, it is frequently necessary to provide a connection between a pair of optical fibres so that light can be transmitted between the fibres. With such an arrangement, a problem exists in providing a connector which ensures accurate alignment between the mutually presented end surface of the fibres but which at the same time is simple and inexpensive to manufacture.

To date, a number of solutions have been proposed to the problem of providing a simple and efficient optical fibre connector. For example, German OS No. 2717321 discloses an optical fibre connector, which in its simplest form, comprises two identical, substantially planar blocks, each of which is provided with two axially spaced, resilient, upstanding clamps which are used to grip a respective fibre in the required position on the block. Each block is also provided with an upstanding guide for the optical fibre which, in use, is gripped by the clamps on the other block and which is to be optically connected to the fibre mounted on the first-mentioned block. The guide members are arranged so that, when the two blocks are presented to each other with the fibres gripped in their respective clamps, each guide member lies between and is gripped by the two clamps on the opposing block. The blocks are thereby locked together with the two fibres being held in their correct relative orientation.

Providing dimensional tolerances are accurately maintained, a satisfactory connection between optical fibres can be made by the arrangement disclosed in German OS No. 2717321. However, any dimensional inaccuracy can cause shear stresses to be imposed on the fibres at the interfaces between the clamps and the guides. Moreover, even without such inaccuracies, stresses at these interfaces can be imposed when the two blocks are being assembled, since the interlocking arrangement is hidden from view during assembly and hence it would be simple for an operator to assemble the blocks with some slight transverse misalignment, thereby resulting in the shearing action. A partial solution to these problems can be achieved by employing the modified arrangement disclosed in DE OS No. 2717321 in which further upstanding clamping means is provided on the surface of each block where the respective fibre is mounted, but at a remote site from the fibre so that any transverse forces applied to the assembled connector will not allow this shearing action to occur. However, even this alternative arrangement is not entirely satisfactory since the additional clamping means make the connector bulky and assembly of the two blocks is still effected with the interlocking and clamping arrangements hidden from view.

A further optical fibre connector is disclosed in British Pat. No. 1586001 which, in its simplest form as shown in FIGS. 1 to 5, includes identical L-shaped blocks each of which is formed in one limb with a channel arranged to receive a respective one of the fibres to be interconnected. The other limb of each block is provided with a bore through which the associated fibre must be inserted prior to the assembly of the connector. Assembly is effected with the channels being presented to each other and with the other limbs of the blocks defining vertical mating surfaces which control the positioning of the ends of the fibres with respect to each other. The fibres are clamped between the channels to provide the required axial alignment of the fibres and elastomeric pads are provided in the channels respectively to support the fibres when the connector is assembled. In the assembled connector, the blocks are apparently held in abutment by means of a sheath provided around the assembly, although this sheath is only disclosed in relation to a more complex embodiment shown in FIGS. 6 to 14.

Whereas the connector disclosed in British Pat. No. 1586001 avoids the problem of blind assembly, it can still impart some shear stresses in the fibres if the vertical surfaces defined by the other limbs of the L-shaped blocks do not mate over substantially their entire surfaces. Further, this device suffers from the problem that moulding of the blocks is a relatively complex operation in requiring the provision of bores in the other limbs. Moreover, except in the more complex and hence more difficult to mould version, there is no adequate provision to prevent separation of the assembled blocks in a direction parallel with the axis of the fibres.

SUMMARY OF THE INVENTION

An object of the present invention is to overcome or alleviate the above-mentioned problems experienced with known optical fibre connectors.

Accordingly, the invention resides in an optical fibre connector comprising a first member composed of a rigid material and formed in one surface thereof with an elongated groove for axially receiving respective end portions of a pair of optical fibres to be interconnected, a second member substantially indentical with the first member and engageable therewith such that said grooves are in registration and can locate therebetween the end portions of said pair of fibres, with the end portion of each fibre being fixed relative to a respective one of the members and a resilient element which, when said first and second members are interengaged co-operates with said first and second members such that one end of the resilient element is anchored relative to the first member at a position between the free end of the end portion of one of the fibres and where said one fibre projects from the first member, while the other end of the resilient element is anchored relative to the second member at a position between the free end of the end portion of the other fibre and where the other fibre projects from the second member, the resilient element being stressed when co-operating with said interengaged first and second members, and being arranged so as thereby to impart to the first and second members a force having a first component in a direction urging said one surfaces together, and a second component in a direction parallel with the axes of the fibres so as to apply a sliding force to the members.

Conveniently said resilient element is a component separate from and engageable with each of said first and second members.

Alternatively said resilient element is a component integral with one of said first and second members and engageable with the other of said members.

In the connector according to the invention, the means for locating the fibres to be interconnected and clamping together the first and second members are clearly visible to an operator during assembly of the connector. Further, the resilient element not only acts by virtue of the first force component to clamp the first and second members together, but also applies a second axial component to the members which, together with the support provided to the fibres by the aligned grooves, reduces any tendency for twisting or shearing forces to be applied to the fibres. In the same way, any tendency for the fibres to move apart in service is reduced without any need to introduce interlocking arrangements on the bodies. In addition, by providing an arrangement having both the first and second components of the clamping force, there is no need for the locating grooves completely to surround the fibres and clamp the two connector halves together in the manner of the device disclosed in British Pat. No. 1586001. This not only allows the cross-section of the grooves to be simplified but also means that the cross section can be optimised accurately to align the fibres despite possible variation in the fibre diameters and without the need for the elastomeric pads employed in British Pat. No. 1586001.

Conveniently, the groove in each of the first and second members is of substantially V-configuration.

Conveniently, said one surface of each member is formed with a channel which extends adjacent the periphery of said surface and which at least partly surrounds the groove in the respective member, the channels serving to restrict penetration of moisture between the members in the assembled connector.

Preferably, the resilient element applies said force to the first and second members substantially at two points on the members respectively and said points lie in a plane which extends perpendicular to said one surfaces of the members and which contains the axes of the fibres.

Conveniently, the groove in each member is divided into two portions separated by a gap of increased depth and width as compared with the remainder of the groove, the free end of each of the pair of optical fibres extending into said gap. The provision of the increased dimension gap has the advantage of accommodating any flairing of the ends of the fibres which may result from incorrect severing of the ends of the fibres during, for example, adjusting the length of the fibres.

Conveniently, the optical fibres are formed of a synthetic resin material and the second component of said force imparts a sliding movement to the first and second members in a direction to urge the fibres into abutment.

Alternatively, each fibre is formed of glass and the end portions of said pair of fibres are clamped between said members with the free end thereof being maintained in spaced relationship. Preferably, where said fibres are glass fibres, the first and second members are provided with respective stop means to limit relative sliding movement of the members in a direction to urge said fibres into abutment. Preferably, the stop means is located at or adjacent said plane extending perpendicular to said one surfaces and containing the fibre axes.

BRIEF DESCRIPTION OF THE DRAWINGS

In the accompanying drawings, which illustrate one example of the invention.

DESCRIPTION OF THE PREFERRED EMBODIMENTS

Figure 1:
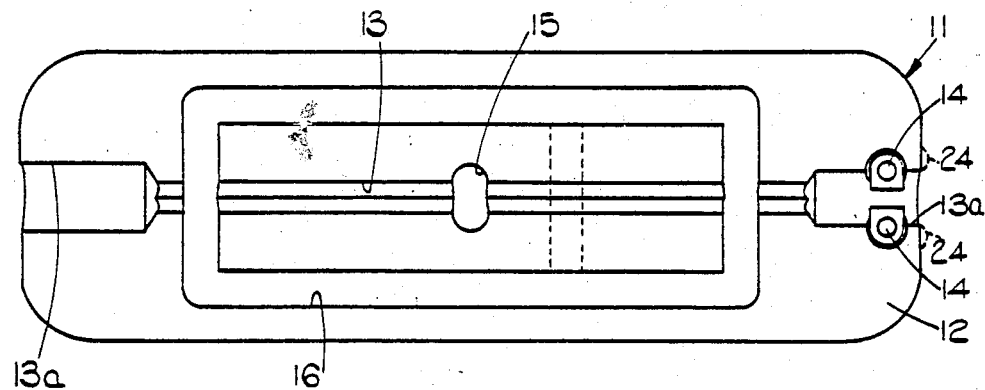
FIG. 1 is a plan view of one member of an optical fibre connector.

Referring to the drawings, the connector includes two identical members moulded in a rigid material, conveniently but not essentially a transparent acrylic. For the sake of convenience, only one of the members is shown in the drawings and designated by the reference numeral 11. Moreover, the following discussion will only refer to said one member 11, but it is to be appreciated that the discussion applies equally to the other member.

The member 11 is generally rectangular and is formed in one major surface 12 with a centrally disposed groove 13 which extends parallel with the longer sides of the member. Along the majority of its length, the groove 13 is of generally V-configuration, but at each end opens out into an enlarged, part-cylindrical portion 13a. Extending through the member 11 at opposite sides respectively of one end portion 13a of the groove 13 are a pair of bores 14, while at its centre the groove 13 communicates with a recess 15 which is both deeper and wider than the groove. Also formed in said one surface 12 of the member 11 is an annular channel 16 which extends parallel with and adjacent to the edges of the member 11 partly to surround the groove 13.

In its opposite major surface 17, the member 11 is formed with a slot 18 which extends transverse to the longer sides of the member at a position disposed between the recess 15 and one end of the member 11. As described in detail below, the slot 18 serves to anchor one end of a resilient element 19 (FIG. 4) which, in use, clamps together the two members 11 of the connector.

Figure 4:
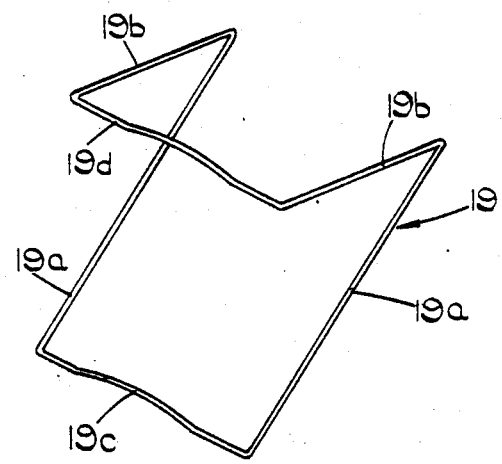
FIG. 4 is a perspective view of the resilient element of the connector.

As shown in FIG. 4, the resilient element 19 is defined by a length of metal wire which has been bent into a double V-configuration with one limb 19a of each V-shaped portion being longer than the other limb 19b of its associated portion and with the longer limbs 19a being joined by a first integral cross piece 19c, while the shorter limbs 19b are joined by a second integral cross piece 19d.

Figure 5:
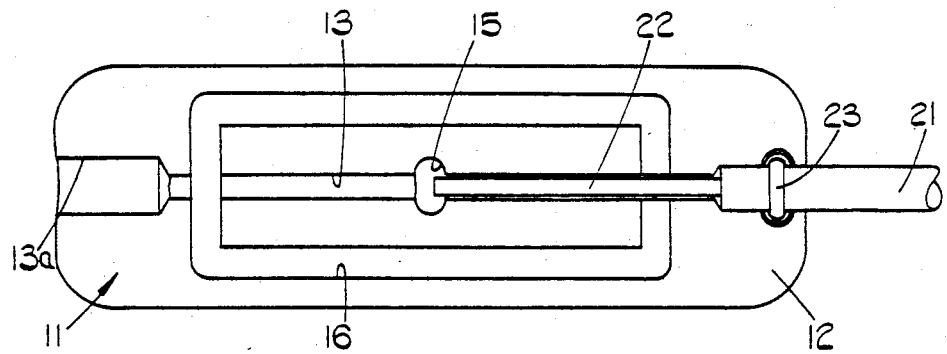
FIG. 5 is a view similar to FIG. 1 but illustrating an optical fibre in position.
Figure 6:
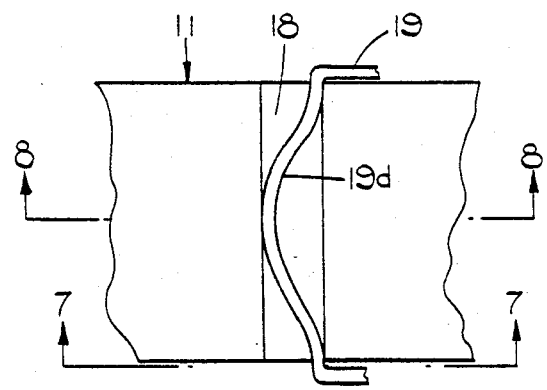
FIG. 6 is an enlarged view (not to scale) of part of the member of FIGS. 1 to 3 and showing in position, part of the resilient element of FIG. 4.
Figure 7:
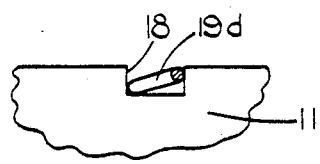
FIGS. 7 and 8 are sectional views on the lines 7—7 and 8—8 respectively in FIG. 6.
Figure 8:
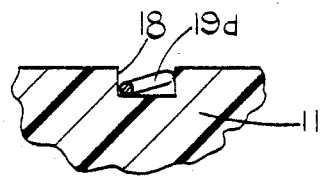

The connector of said one example is intended to interconnect a pair of optical fibre cables (one only shown in FIG. 5), each of which is provided in conventional manner, with an outer protective sheath 21. To interconnect the fibre cables, the end portion of each sheath 21 is initially removed to expose part of its associated fibre 22. The exposed part of one fibre is then located axially in the region of the groove 13 in one member 11 between the recess 15 and the enlarged groove portion 13a containing the bores 14, while the exposed part of the other fibre is located in the same position in the groove 13 in the other member 11. The fibres are then fixed relative to their respective grooves, peferably by means of an adhesive, for example a cyanoacrylate adhesive. In each case, the length of the protective sheath removed from each fibre is arranged so that part of the sheathed fibre is seated in said one enlarged groove portion 13a of its associated member 11, with the free end of the sheath 21 abutting against the shoulder defined by said one enlarged groove portion 13a and the V-shaped remainder of the groove. Moreover, the free end of each fibre is arranged to extend into the recess 15 in its associated member 11 so that if the fibre end is enlarged as a result of, for example, incorrect cutting of the fibre to size, the enlarged end is accommodated by the increased dimensions of the recess 15.

When the end portions of the fibre cables are correctly located relative to their associated members 11, a spring clip 23 is inserted through the bores 14 in each member 11 around the portion of the cable sheath seated in the associated groove portion 13a, thereby to assist in retaining the respective fibre cable in position and remove the possibility of any forces causing peeling of the fibres from their seatings once the adhesive fixing them in their grooves 13 is set. The members 11 are then moved into interengagement such that said one surfaces are presented to each other and so that the portion of the groove 13 in each member 11 not receiving the exposed part of a respective optical fibre is presented to the region of the groove in the other member which receives its associated exposed fibre part. In this way, the exposed fibre parts are held in mutual alignment between the grooves 13, with the grooves enclosing, but not necessarily completely surrounding, the fibres. When the members 11 are assembled, the recesses 15 are also in alignment and, where the fibres are synthetic resin fibres, the free ends of the fibres are arranged to extend into the aligned recesses into abutment with one another. Where, however, glass fibres are employed, although the free ends of the fibres again extend into the aligned recesses 15, it is important to ensure that the ends are spaced from one another (as explained later) since, if the ends extend into abutment, abrasion can occur. The channels 16 are also in alignment when the members 11 are assembled and define a barrier which, in use, restricts moisture penetrating between the members 11 from entering the channels and thereby prevents or minimises moisture contact with the exposed fibres.

When the members 11 are assembled with the fibres therebetween, the resilient element 19 is engaged with the members. This is effected by passing the sub-assembly of the members 11 and the fibres between the V-shaped portions of the element 19 until one of the cross-pieces 19c, 19d engages in the slot 18 in one of the members 11. The element is then stressed such that the other cross-piece 19d, 19c can move over the edge of the slot 18 in the other member 11 and into engagement with said slot 18, the small amount of extra stressing required to move the element 19 over the edge of said slot providing resistance to accidental disengagement of the members 11 in service. When the element 19 is in position, it will be apparent that one end thereof, as defined by the cross-piece 19c or 19d, is anchored relative to one member 11 at a position between the free end of the exposed part of one of the fibres and where said one fibre projects from said one member 11, while the other end of the stressed resilient element, as defined by the cross piece 19d or 19c, is anchored relative to the other member 11 at a position between the free end of the exposed part of the other fibre and where the other fibre projects from the other member 11. In this way, the element 19 imparts to the members 11, a force having a first component in a direction urging said one major surfaces together, as well as a second component in a direction parallel with the axes of the fibres so as to apply a sliding force to the members. Preferably, as shown in FIGS. 4, 6, 7 and 8, each cross piece 19c, 19d is bowed at its centre in relation to both the width and the depth of the slot 18, so as to make substantially point contact with the side and base walls of the respective slot 18. In this way, the axial force applied by the resilient element to the members 11 acts substantially at two points which lie in a plane extending perpendicular to said one major surfaces and containing the axes of the fibres. As mentioned previously, the provision of a component of the clamping force acting parallel, and preferably co-extensive, with the axes of the fibres reduces any tendency for shearing or twisting forces to be applied to the fibres both during assembly and in service. It is not critical whether the sliding force imparted to the members 11 by this axial component acts in a direction to urge the fibres towards each other or away from each other, although in the case of synthetic resin fibres, where it is desirable that the free ends of the fibres should be held in abutment by the connector, it is preferred to arrange that the axial component urges the fibres together. This arrangement is achieved in the embodiment described above by ensuring that each end of the resilient element 19 is anchored to a region of one of the members 11 to which a respective fibre is joined and at a position upon the member between the free end of the respective fibre and where the fibre projects from the member. By way of contrast, in order to arrange that the axial component urges the fibres away, the anchorage point for each end of the element 19 would be provided in a region of one of the members 11 to which no fibre is attached and at a position on said one member between the free end of the fibre carried by the other member and where said fibre projects from the other member.

Figure 2:
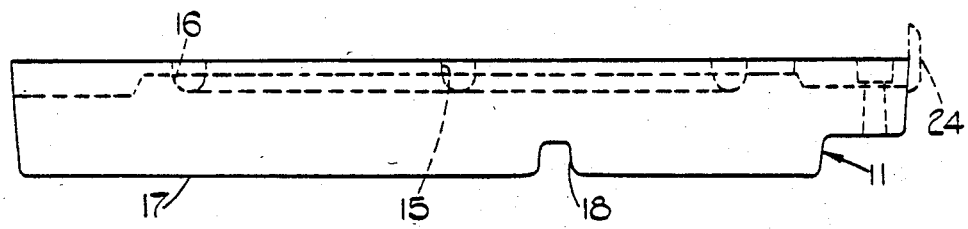
FIG. 2 is a side view of the member shown in FIG. 1.
Figure 3:
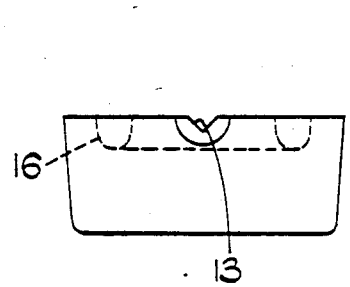
FIG. 3 is an end view of the member shown in FIG. 1.

As an additional point, it is to be understood that arranging for the grooves 13 to be of V-configuration not only simplifies moulding of the members 11 but also allows the fibres to be accurately aligned by the grooves despite possible variation in the fibres diameters and without the need for the elastomeric pads employed in British Pat. No. 1586001.

Where the fibres are formed of glass, it is preferable to provide each member with stop means, conveniently in the form of integral peg means 24 (FIGS. 1 and 2) depending from one end of each member 11, to limit relative sliding movement of the members in a direction to bring the exposed ends of the fibres into abutment. In order to minimise or prevent the generation of forces which could tend to misalign the fibres, the stop means is preferably arranged to lie as close as possible to the axes of the fibres.

It will be recognised that if desired the element 19 could be replaced by a component affixed to or integral with one of the members and engageable with the other of the members.

Finally, it is to be appreciated that, although the preceding discussion has been restricted to the interconnection of a pair of individual optical fibres, the connector of the invention can also be used to interconnect respective fibres in a pair of optical fibre bundles, or by the provision of more than one 'V' groove in each member, more than one pair of fibres or fibre bundles can be interconnected.

I claim:

1. An optical fibre connector comprising a first member composed of a rigid material and formed in one surface thereof with an elongated groove for axially receiving respective end portions of a pair of optical fibres to be interconnected, a second member substantially identical with the first member and engageable therewith such that said grooves are in registration and can locate therebetween the end portions of said pair of fibres, with the end portion of each fibre being fixed relative to a respective one of the members, and a resilient element which, when said first and second members are interengaged, co-operates with said first and second members, one end of the resilient element being anchored relative to the first member at a position between the free end of the end portion of one of the fibres and the point at which said one fibre projects from the first member, while the other end of the resilient element is anchored relative to the second member at a position between the free end of the end portion of the other fibre and the point at which said other fibre projects from the second member, the resilient element being stressed when co-operating with said interengaged first and second members and being arranged so as thereby to impart to the first and second members a force having a first component in a direction urging said one surfaces together, and a second component in a direction parallel with the axes of the fibres so as to apply a sliding force to the members.

2. A connector as claimed in claim 1 wherein said resilient element is a component separate from and engageable with each of said first and second members.

3. A connector as claimed in claim 1 wherein said resilient element is a component integral with one of the members and engageable with the other of said members.

4. A connector as claimed in claim 1, wherein the groove in each of the first and second members is of substantially V-configuration.

5. A connector as claimed in claim 2 wherein the groove in each of the first and second members if of substantially V-configuration.

6. A connector as claimed in any one of claims 1 to 5, wherein said one surface of each member is formed with a channel which extends adjacent the periphery of said surface and which at least partly surrounds the groove in the respective member, the channels serving to restrict penetration of moisture between the members in the assembled connector.

7. A connector as claimed in any one of claims 1 to 5 wherein said resilient element applies said force to the first and second members substantially at two points on the members respectively and said points lie in a plane which extend perpendicular to said one surfaces of the members and which contains the axes of the fibres.

8. A connector as claimed in claim 6 wherein said resilient element applies said force to the first and second members substantially at two points on the members respectively and said points lie in a plane which extend perpendicular to said one surfaces of the members and which contains the axes of the fibres.

9. A connector as claimed in any one of claims 1 to 5 wherein said groove in each member is divided into two portions separated by a gap of increased depth and width as compared with the remainder of the groove, the free end of each of the pair of optical fibres extending into said gap.

10. A connector as claimed in claim 8, wherein said groove in each member is divided into two portions separated by a gap of increased depth and width as compared with the remainder of the groove, the free end of each of the pair of optical fibres extending into said gap.

11. A connector as claimed in any one of claims 1 to 5 wherein said optical fibres are formed of a synthetic resin material and the second component of said force imparts a sliding movement to the first and second members in a direction to urge the fibres into abutment.

12. A connector as claimed in any one of claims 1 to 5 wherein each optical fibre is formed of glass and the end portions of said pair of fibres are clamped between said members with the free ends thereof being maintained in spaced relationship.

13. A connector as claimed in claim 12 wherein the first and second members are provided with respective stop means to limit relative sliding movement of the members in a direction to urge said fibres into abutment.

14. A connector as claimed in claim 13 wherein said stop means is located at or adjacent a plane extending perpendicular to said one surfaces and containing the axes of the optical fibres.

* * * * *